(12) United States Patent
Billharz et al.

(10) Patent No.: US 10,108,734 B2
(45) Date of Patent: *Oct. 23, 2018

(54) ARCHITECTURE TO EXPOSE INTERNAL BUSINESS DATA ON A WEBSITE

(75) Inventors: Alan Billharz, Kirkland, WA (US); Michael Monarch, Hingham, MA (US); Marta Rey-Babarro, Seattle, WA (US)

(73) Assignee: MICROSOFT TECHNOLOGY LICENSING, LLC, Redmond, WA (US)

( * ) Notice: Subject to any disclaimer, the term of this patent is extended or adjusted under 35 U.S.C. 154(b) by 901 days.

This patent is subject to a terminal disclaimer.

(21) Appl. No.: 13/621,178

(22) Filed: Sep. 15, 2012

(65) Prior Publication Data

US 2013/0019153 A1 Jan. 17, 2013

Related U.S. Application Data

(63) Continuation of application No. 12/484,483, filed on Jun. 15, 2009, now Pat. No. 8,281,233.

(51) Int. Cl.
*G06F 17/30* (2006.01)
*G06F 17/24* (2006.01)
*G06F 17/21* (2006.01)
*G06F 17/22* (2006.01)

(52) U.S. Cl.
CPC ...... *G06F 17/30893* (2013.01); *G06F 17/218* (2013.01); *G06F 17/2247* (2013.01); *G06F 17/24* (2013.01); *G06F 17/246* (2013.01); *G06F 17/3089* (2013.01)

(58) Field of Classification Search
CPC .. G06F 17/2247; G06F 17/24; G06F 17/3089; G06F 17/246; G06F 17/30011; G06F 17/211; G06F 17/218
See application file for complete search history.

(56) References Cited

U.S. PATENT DOCUMENTS

| 6,157,934 A | 12/2000 | Khan et al. |
| 6,691,281 B1 | 2/2004 | Sorge et al. |
| 6,744,442 B1 * | 6/2004 | Chan .................. G06T 15/04 345/582 |

(Continued)

OTHER PUBLICATIONS

"Publishing a Document from Microsoft Office to Your Website (Windows-Only)," Using and Administering Contribute, accessed on Apr. 30, 2009, accessed at: http//help.adobe.com/en_US/Contribute/4.1/help.html?content=con_publishing_pu_11.html, 4 pages.

(Continued)

*Primary Examiner* — Thu Huynh
(74) *Attorney, Agent, or Firm* — Merchant & Gould P.C.

(57) ABSTRACT

A method for importing document data into a website hosted on a server computer includes a block of document data that is received at the server computer. The block of document data includes data from an identified section of a document. In response to receiving the block of document data, the server computer automatically updates a web page component on the website. The web page component is selected via a document widget on the server computer. The document data is mapped to the web page component.

20 Claims, 10 Drawing Sheets

(56) References Cited

U.S. PATENT DOCUMENTS

| | | | |
|---|---|---|---|
| 6,976,210 B1* | 12/2005 | Silva | G06F 17/30867 707/E17.109 |
| 7,340,675 B1 | 3/2008 | Hancock | |
| 7,437,342 B2 | 10/2008 | Khandekar | |
| 7,458,014 B1* | 11/2008 | Rubin | G06F 3/0488 709/206 |
| 7,478,336 B2 | 1/2009 | Chen et al. | |
| 7,519,573 B2 | 4/2009 | Helfman et al. | |
| 8,281,233 B2* | 10/2012 | Billharz | G06F 17/246 715/212 |
| 2002/0129054 A1 | 9/2002 | Ferguson et al. | |
| 2002/0188629 A1 | 12/2002 | Burfoot | |
| 2002/0194226 A1 | 12/2002 | Sheth et al. | |
| 2003/0020671 A1* | 1/2003 | Santoro | G06F 3/0481 345/1.3 |
| 2003/0167315 A1* | 9/2003 | Chowdhry | G06F 17/30873 709/218 |
| 2004/0008212 A1* | 1/2004 | O'Neill | G06T 9/001 345/628 |
| 2004/0010622 A1* | 1/2004 | O'Neill | G06T 9/001 709/247 |
| 2005/0240864 A1 | 10/2005 | Leetaru et al. | |
| 2005/0267853 A1 | 12/2005 | Netz et al. | |
| 2006/0004793 A1 | 1/2006 | Edwy et al. | |
| 2006/0031198 A1* | 2/2006 | Newbold | G06F 17/30864 |
| 2006/0041832 A1 | 2/2006 | Cho et al. | |
| 2006/0112123 A1* | 5/2006 | Clark | G06F 17/246 |
| 2007/0174764 A1 | 7/2007 | Roseway et al. | |
| 2007/0204064 A1 | 8/2007 | Mail et al. | |
| 2008/0320306 A1 | 12/2008 | Yamamura | |
| 2009/0006953 A1 | 1/2009 | Perantatos et al. | |
| 2009/0063949 A1* | 3/2009 | Duan | G06F 17/2247 715/234 |
| 2009/0064311 A1* | 3/2009 | Clark | G06Q 20/10 726/14 |
| 2009/0100358 A1* | 4/2009 | Lauridsen | G06F 17/3089 715/762 |
| 2009/0235082 A1 | 9/2009 | Garrett | |
| 2010/0107222 A1 | 4/2010 | Glasser | |
| 2014/0033013 A1* | 1/2014 | Shaver | G06F 17/24 715/230 |

OTHER PUBLICATIONS

"Sitecore Word Module. Create and edit content in Sitecore using Microsoft® Word and benefit from all of the features of Office 2003," Sitecore®, accessed on Apr. 30, 2009, accessed at: http://www.catalyst-cms.com/upload/sitecore_word_module_001.pdf, 2 pages.

"Using Microsoft Word to Edit Web Page Text Areas," Winferno Software, accessed on Apr. 30, 2009, accessed at: http://www.winferno.com/help/ResearchDesk/BrowserWord.aspx, 3 pages.

"WebFOCUS Web Services," Information Builders, accessed on May 1, 2009, accessed at: http://www.informationbuilders.com/products/webfocus/web_services.html, 2 pages.

\* cited by examiner

ARCHITECTURE TO EXPOSE INTERNAL BUSINESS DATA ON A WEBSITE

CROSS REFERENCE TO RELATED APPLICATIONS

This application claims priority to U.S. patent application Ser. No. 12/484,483, filed Jun. 15, 2009, entitled ARCHITECTURE TO EXPOSE INTERNAL BUSINESS DATA ON A WEBSITE, now U.S. Pat. No. 8,281,233, the disclosure of which is incorporated by reference herein in its entirety.

BACKGROUND

Organizations store business data on internal systems that typically are not available to the public. The business data is typically captured in document sources such as word processor documents and spreadsheets. Websites provide a way to display information to a wide audience. The automated display of internal business data on a website using these document sources typically requires a degree of knowledge and expertise typically not available to a layperson.

SUMMARY

Embodiments of the disclosure are directed to a method for importing data into a website hosted on a server computer. A block of document data is received at the server computer. The block of document data comprises data from an identified section of a document. In response to receiving the block of document data, the server computer automatically updates a web page component on the website. The web page component is selected via a document widget on the server computer. The document data is mapped to the web page component.

This summary is provided to introduce a selection of concepts in a simplified form. These concepts are further described below in the Detailed Description. This summary is not intended to identify key features or essential features of the claimed subject matter, nor is this summary intended as an aid in determining the scope of the claimed subject matter.

DETAILED DESCRIPTION

The present application is directed to systems and methods for exposing internal business data on a website. A website is a collection of related web pages hosted on a web server. The web pages can be accessed through a network, such as the Internet.

In example embodiments, a document widget is provided for a website. In this disclosure, a document widget is a graphical user interface component used on the website. The document widget can be configured to obtain data from a document or application and display the data on the website.

The document widget permits a user to select a data element in a document containing internal business data or other data. In this disclosure, a data element is an identifiable part of a document, such as a table or graph within a word processor document or spreadsheet. The data element comprises document data, for example the data in a table or graph that can be displayed on a website. The data element is typically stored on a server computer or on a client computer that may be accessible to over a network. In some example embodiments, the data element may be stored on the same server computer that hosts the website, although the data element may be stored in a private area of the web site not publicly available.

The document widget also permits a user to select a web page component, such as a table or a graph, for displaying the data element on the website. When a connection is established between the document widget and the document, any updates to the data element are automatically displayed on the website.

Figure 1:
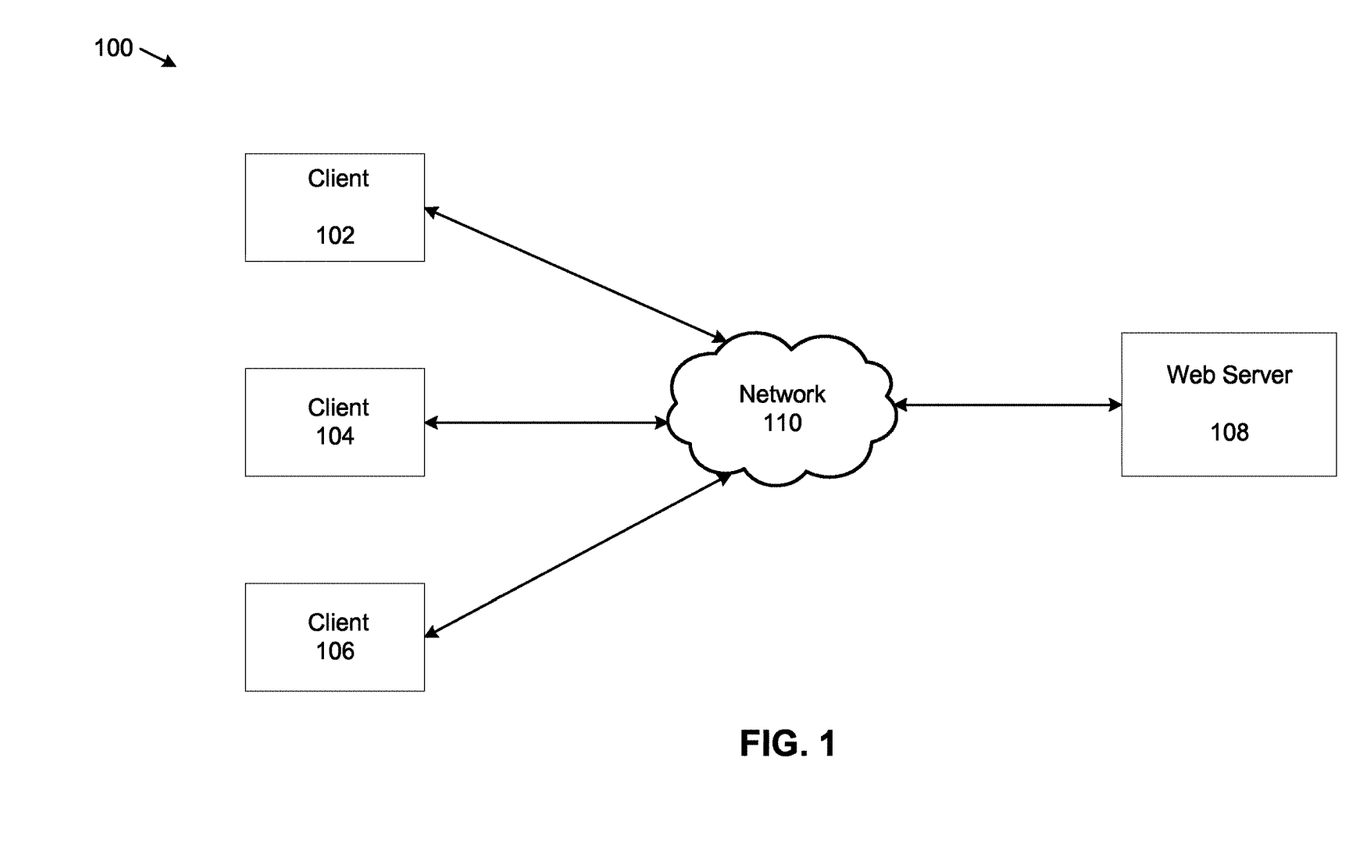
FIG. 1 shows an example system for exposing internal business data on a website.

FIG. 1 shows an example system 100 that supports an architecture for exposing internal business data on a website. The system 100 includes clients 102, 104, 106, a web server 108 and a network 110. More or fewer clients and servers can be used. In this disclosure the terms client and client computer are used interchangeably, and the terms server and server computer are used interchangeably.

Among the plurality of information stored on the clients 102, 104, 106 is a client operating system ("OS") and client applications. The client OS is a program that manages the hardware and software resources of the client system. The client applications utilize the resources of the clients 102, 104, 106 to directly perform tasks specified by a user, for example a user who is creating or editing a document. For example, the clients 102, 104, 106 include one or more software applications, such as word processing programs and spreadsheet programs that are used to create and edit documents and spreadsheets. Two examples of such applications are Microsoft Word word processing software and Microsoft EXCEL® spreadsheet software from Microsoft Corporation of Redmond, Wash. Other examples of such applications, for example Open Office, are also applicable. In this disclosure, the terms document and spreadsheet are used interchangeably.

In example embodiments, client 102 is a client computer used on a corporate or small business network. Client 104 is a computer used by an individual or small business with a direct connection to a network and client 106 is a mobile computer, for example a laptop computer.

Server 108 is a web server. In example embodiments server 108 is part of a system of an online web hosting and shared storage, such as Microsoft Office Live Small Business 2007 from Microsoft Corporation of Redmond, Wash. For example, Microsoft Office Live Small Business 2007 permits users to build a customized web site for their business. In addition, Microsoft Office Live Small Business 2007 permits users to store and share documents online so that the documents can be accessed over the Internet. Documents stored on example clients 102, 104 and 106 or on a file server accessible to clients 102, 104 and 106 can be uploaded to web server 108 to be shared with others over network 110. For example, server 108 can host multiple files in a format (e.g., HTML or XML) that are accessible through a network using a web browser.

Web server 108 may be part of an interconnected server system known as a web server farm. The web server farm may comprise a plurality of servers and data storage units. In example embodiments, network 110 is the Internet, although other types of networks can also be used.

Figure 2:
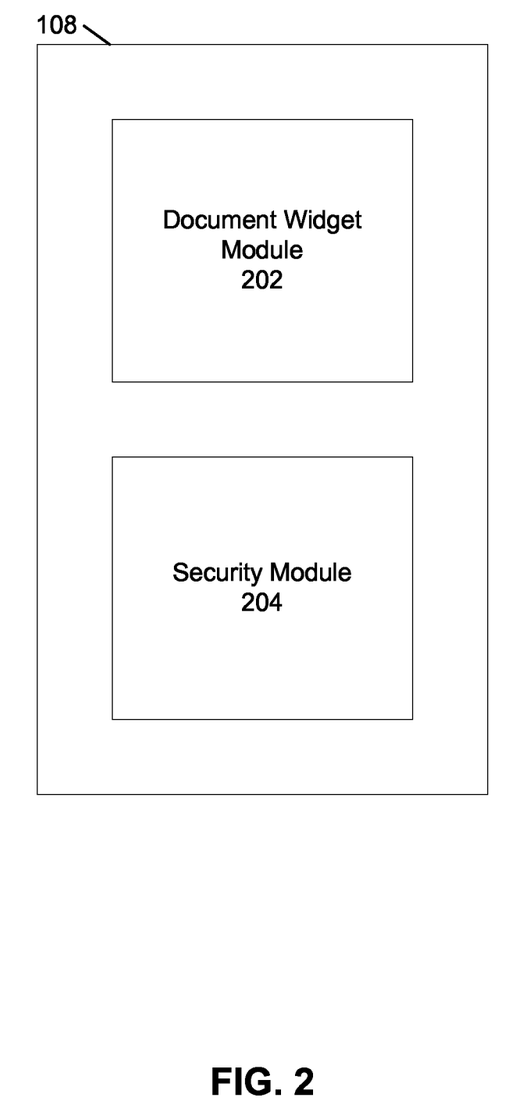
FIG. 2 shows example modules of an example web server of FIG. 1.

FIG. 2 shows example modules of web server 108 including an example document widget module 202 and an example security module 204. The example document widget module 202 provides a document widget that enables a user to select data from a document for display on a web page. The document is typically stored on a server, for example web server 108.

The document may also be stored on a client system, for example clients 102, 104 or 106, or on a file server accessible to a client system. For example, in one embodiment, the document is stored on memory that is local to one of the clients 102, 104, 106. In another embodiment, the document is stored on a server that is separate from that of server 108. For example, the document can be stored on a file server or a document management server that is accessible to the clients 102, 104, 106, so that the clients 102, 104, 106 can access and manipulate the document.

Document data for display on a web page is typically data that changes over time, for example data in a table or graphical data. Document data may also include blocks of text that may or may not change over time.

The document widget also permits a user to select a web page component, typically a table or graph, for display of the document data. The document widget may be dragged from a widget area of the web page to a display location. The document widget may also be expanded in size to accommodate the data to be displayed.

The document widget may also be configured. Configuring the document widget includes identifying the location of the document, identifying a section of the document to be displayed and establishing a connection to the document. Configuring the document widget also includes configuring display settings, for example configuring where the document widget is placed on the web page and how the document widget displays data (for example as a table, a graph, etc.).

The example security module 204 provides a secure connection from the client system, for example clients 102, 104, 106, to web server 108. Web server 108 implements a system of an online web hosting and shared storage, such as Microsoft Office Live Small Business 2007. In order to make changes to a website hosted on web server 108 or to upload document content, a user on a client system typically must logon to web server 108. The example security module 204 maintains security via a userID/password connection from client to server. In example embodiments, it is also possible for the connection from the client system to web server 108 to be unsecured, for example for online document collaboration within a business organization.

Data is transmitted from client to server via web services. A web service supports computer to computer communication over the Internet. To ensure secure communication, the example security module 204 provides a secure identifier, for example a secure socket layer (SSL) identifier, that is typically embedded in document data transmitted from the client system to web server 108. Data is typically transmitted from client to server as a block of data in an HTTP message. The web server 108 typically includes a listener for inbound connections to the web server. In example embodiments, the listener for inbound connections is encapsulated in the example security module 204.

When a user logs on to web server 108, in example embodiments the example security module 204 encrypts the uniform resource locator (URL) of the website hosted on web server 108 after authenticating the login. The client, for example client 102, 104, 106, the decrypts the encrypted URL before sending document data to web server 108. The encryption of the URL provides an additional layer of security and prevents possible spoofing attacks whereby an application edits a file containing document data, modifies the URL and directs the client to a rogue website.

Figure 3:
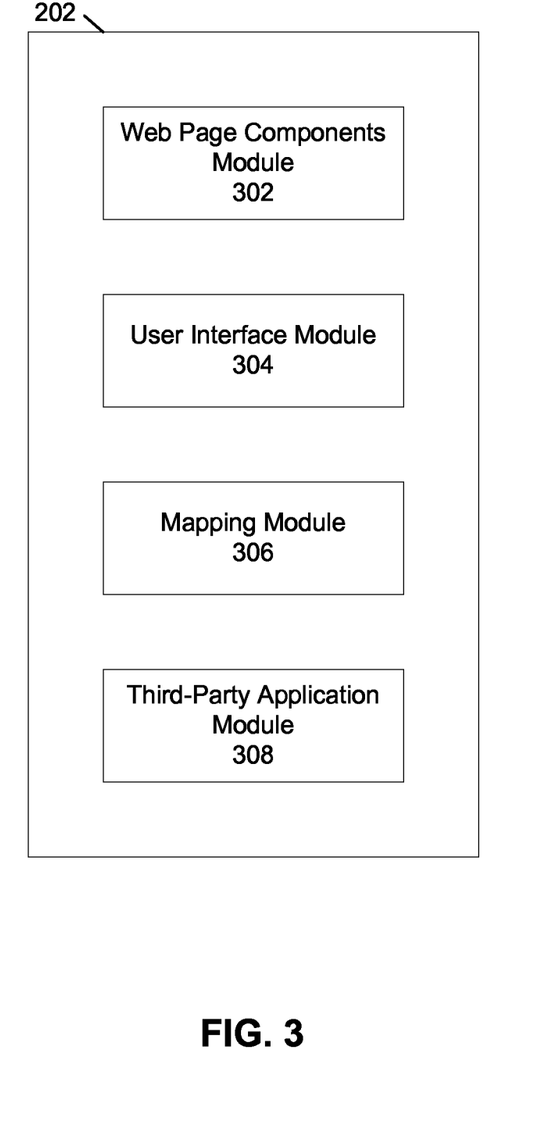
FIG. 3 shows example modules of an example document widget module of FIG. 2.

FIG. 3 shows the functionality of the example document widget module 202 in more detail. The example document widget module 202 includes example web page components module 302, example user interface module 304, example mapping module 306 and example third-party application module 308.

The example web page components module 302 provides a plurality of web page components for displaying document data. Typical web page components include a table, a bar graph, a line graph, a thermometer type graph, a calendar, a timeline, etc. Other web page components are possible.

Typically, document data is displayed in the same form that it exists in a document. For example, if the document data is in tabular form, the document data is typically displayed in tabular form on the website. If the document data is in graphical form, the document data is typically displayed in graphical form on the website. If the document data is a block of text, the document data is typically displayed as text on the website. However, the example document widget module 202 permits document data to be displayed in a plurality of forms on the website. For example, when document data in tabular form in the document is displayed in graphical form on the website, the example document widget module 202 converts the tabular data to graphical form.

The example user interface module 304 provides a user interface for the example document widget module 202. The example user interface typically includes one or more dialog boxes that prompt a user to enter information needed to identify the document and to identify the sections of the document for which document data is exposed on the website. The example user interface module 304 also provides a dialog box for selecting a web page component, such as a table or graph, in which the document data is displayed on example web page 400. Other uses of the example interface module 304 are possible. For example, the user interface may include components other than dialog boxes, for example pull-down list boxes. In another example, web server 108 may automatically enter information to identify the document without the need for user input.

If the document is stored on a client system, for example on client 102, 104, 106, the example user interface module 304 prompts a user on client 102, 104, 106 to enter a user ID, for example a LiveID identifier, and a password. Live ID is single sign-on service, developed by Microsoft Corporation that permits users to logon to many websites using one account. When the user ID and password are authenticated by web server 108, a secure connection is established between the client system and web server 108.

The example mapping module 306 maps an identified section of a document, for example a data element in the document, to a web page component on the web page. The mapping translates the coordinates of the data element in the document to corresponding coordinates of the web page component. The web page component typically is rendered in the space provided by the expanded document widget. Typically, the data element is mapped to fit into the entire space on the website occupied by the document widget. In example embodiments, it is possible to specify a portion of the document widget to which the data element is mapped.

The example third-party application module 308 permits data from third party software applications running on a client system, for example on clients 102, 104, 106 to be displayed on web server 108. For this disclosure, a third-party application is defined as a software application that is not part of Microsoft Office. Software applications that are part of Microsoft Office include Microsoft Word word processing software and Microsoft EXCEL® spreadsheet software.

An example third-party software application is a software application, for example Sage Timberline, that manages the details of a construction business, including accounts payable, accounts receivable, contracts, equipment cost, etc. A user of the software application may want to display a portion of this data on a website so that clients and employees of the construction business can have access to the data. As another example, a non-profit organization may use a third-party software application, for example Giftworks fundraising software, that organizes donations and pledges, tracks donors, manages fundraising events, etc. A user of this software application may want to display a portion of this information, for example the results of a pledge drive, on a public website. For example, the user may want to have a thermometer graph displayed on the website to display the amount of money donated and to show how close the donations are to meeting the goals of the pledge drive.

The example third-party application module processes a connection between example web server 108 and a computer system hosting the third-party application software. The example third-party application module downloads configuration instructions to the third-party application that enable the third-party application to connect to files hosted on a web server, for example to a web page hosted on web server 108. In addition, in example embodiments, the third-party application module provides an application programming interface (API) for the computer system hosting the third-party application. In this example embodiment, the third party application is configured using the API and document data is transferred from the third-party application to web server 108 using the API. The API makes the web server agnostic with respect to the third-party application with which it interfaces, permitting web server 108 to connect to a plurality of third-party applications. In other example embodiments, the third-party application is configured to periodically upload a spreadsheet to web server 108. The spreadsheet is either an EXCEL® spreadsheet or a spreadsheet formatted similarly to EXCEL®. The spreadsheet includes updated data from the third-party application to be displayed on web server 108. Because the spreadsheet is an EXCEL® spreadsheet or a spreadsheet formatted similarly to EXCEL®, web server 108 uses existing spreadsheet processing functionality on web server 108 to process the spreadsheet and to display spreadsheet data on web server 108.

As discussed, document data to be displayed on a website typically resides on a server, for example on web server 108, as part of an online website hosting and document storage system such as Microsoft Office Live Small Business 2007. The advantage of storing the document on a server, such as web server 108, is that the document data is available to be synchronized with the data displayed on the website. Whenever the document is updated, the website display is automatically updated. Document data is pushed to the website whenever the document is updated on web server 108.

When document data is stored on a client system, for example on one of clients 102, 104, 106, a connection needs to be established to web server 108. When a connection is established, document data is typically transferred via web services. In example embodiments, the client system automatically pushes data to the website when the document data is updated on the client system. For example, the document data can be pushed to web server 108 whenever the document is saved by a client device. Each time the document is revised and saved, any updates to the document data can be transmitted to web server 108.

In the case of a mobile device, for example client 106, because a mobile device may be offline for an extended period of time, in example embodiments, when client 106 is offline and comes back online, client 106 sends updated document data to web server 108 when client 106 is reconnected to network 110 and comes back online.

In other example embodiments, web server 108 initiates the transfer of document data from the client system. For example, web server 108 can be programmed to periodically pull updated document data. In one embodiment, web server 108 is configured to pull updated document data at specific intervals, such as 1 hour, 1 day, 1 week, or 1 month. In another example, web server 108 is programmed to pull updated document data if a specified period of time elapses without an update from the client, such as 1 week or 1 month. Other configurations are possible.

Figure 4:
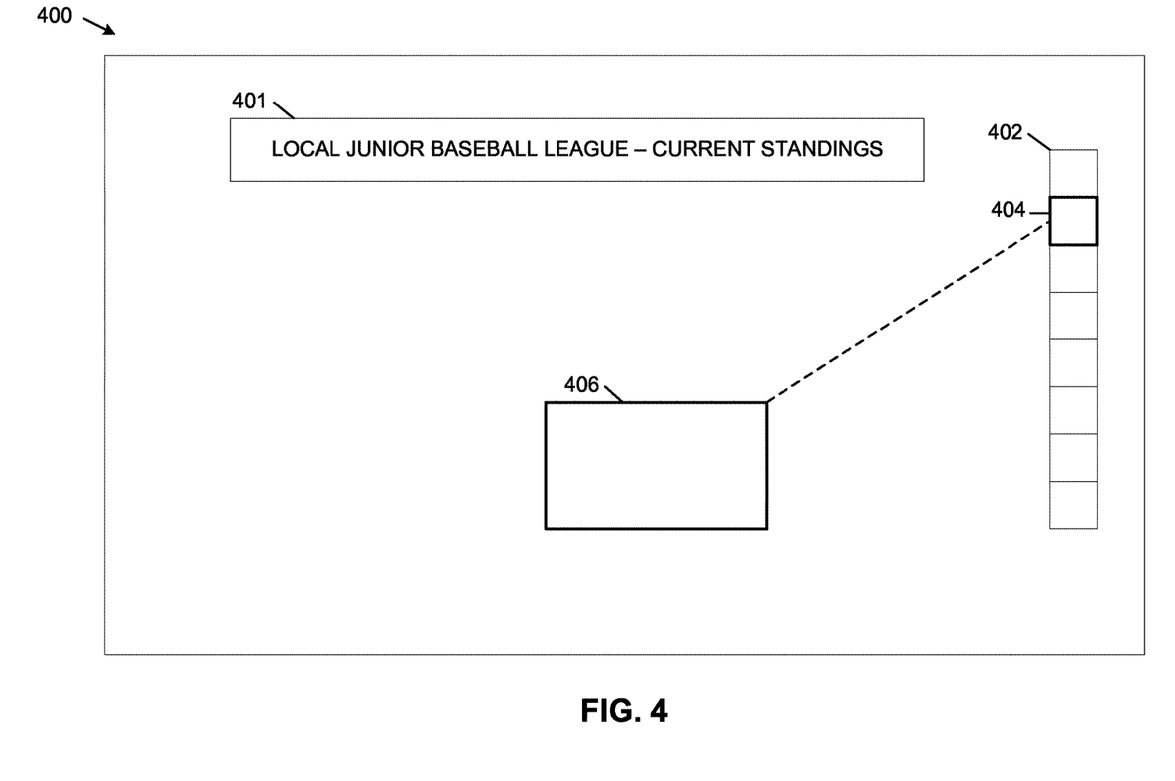
FIG. 4 shows an example document widget on a web page rendered on the example web server of FIG. 1.

FIG. 4 shows an example web page 400 on web server 108. The example web page 400 includes a banner 401 indicating that the example web page 400 provides information about an example junior baseball league. The example web page 400 permits a user that is logged on to web server 108 to select a document widget, position the document widget on the web page and configure the document widget to display data from a section of a document.

The example web page 400 includes example widgets 402 that are selectable on the web page. In this disclosure, a widget is a graphical user interface component having a specific functionality. The example widgets 402 include widgets that can be used for a variety of purposes. Some example widgets 402 include a weather widget that displays a weather summary for a geographical area, a slide show widget that brings up a slide show and a contact module to add contact information to the website. In addition, widgets 402 also include example document widget 404. Other examples of widgets are possible. Each widget 402 can be dragged from the side of the web page, moved to a desired location and expanded in size. In other example embodiments, instead of dragging a widget to a location, a user defines a zone on the example web page 400 and assigns a widget to the zone. In this example, a zone comprises a selected area on web page 400. Other examples of locating a widget on a web page are possible.

The example document widget 404 includes functionality to display document data on the web page. FIG. 4 shows the example document widget 404 dragged from the side of the web page to a new location 406 and expanded in size. When the example document widget 404 is dragged to location 406, an example user interface 500 is activated on the web page 400. The example user interface 500 is typically a dialog box displayed on the web page 400 in which data is entered by a user. In example embodiments, more than one dialog box may be sequentially displayed.

Figure 5:
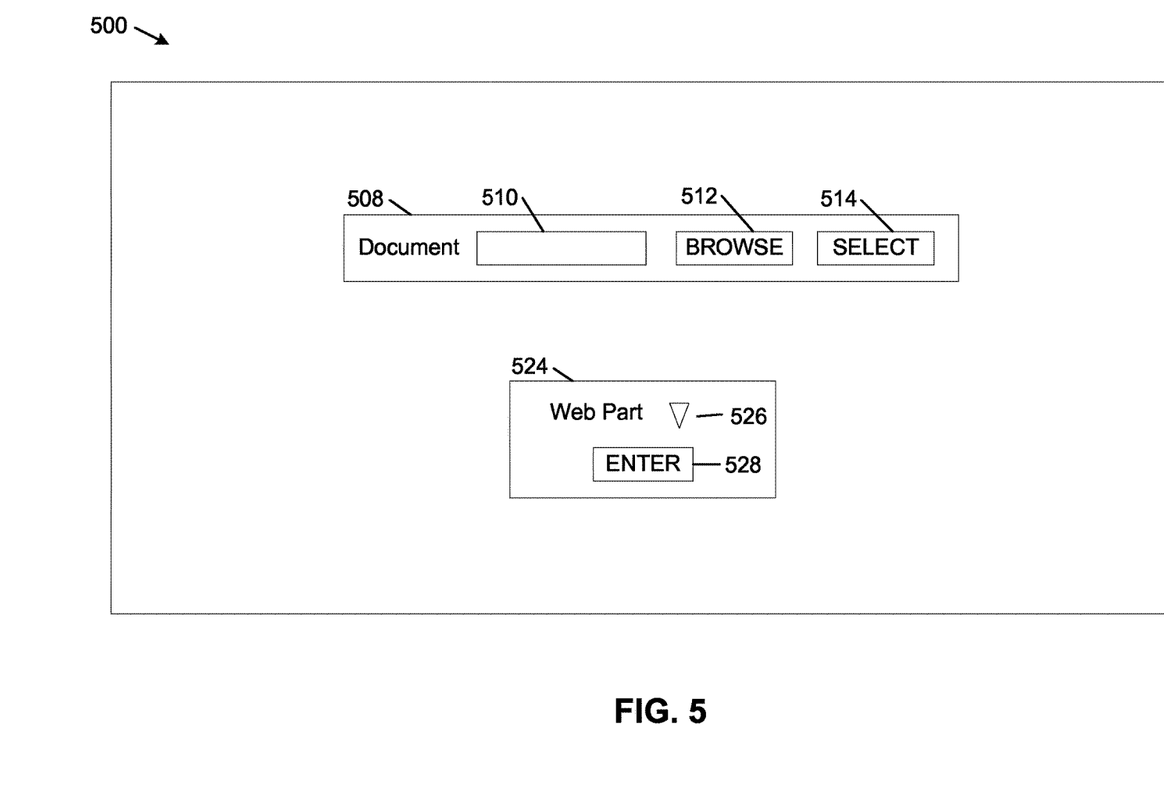
FIG. 5 shows an example user interface used in conjunction with the document widget module of FIG. 2.

FIG. 5 shows two example dialog boxes that comprise the example user interface 500. An example document dialog box 508 is displayed when the example document widget 400 is dragged to location 406. The example document dialog box 508 includes a document identifier field 510, a Browse button 512 and a Select button 514. Other fields are possible. When the user clicks on Browse button 512, the user can browse for a document on web server 108 or on computer systems accessible to web server 108. When the user locates a document to be displayed on example web page 400, the user presses Select button 514. Pressing the Select button 514 establishes a connection between the example document widget 406 and the document.

In example embodiments, when a document is identified, for example by pressing the example Select button 514, an application programming interface (API) is activated. The API permits a user to determine elements of the document, for example worksheets, tables, graphs, etc., that are available for display on the example website 400. The API also permits a user to refine selected portions of a document further. For example, if a table is selected on a document, the API permits the user to select a range of rows and tables from the table.

When a document is identified for display on example web page 400 and a connection to the document is established, the example document widget module 202 displays an example dialog box 524 for selecting a web page component. The example dialog box 524 includes a drop-down list box 526 that lists web page components available on web server 108 for displaying document data. Some example web page components are tables, line graphs, bar graphs, etc. Typically, a user selects a web page component corresponding to the way data to be rendered by the web page component is displayed in the document. When the user selects a web page component to be used, the user presses example Enter button 526 to enter the web page component in web server 108.

Figure 6:
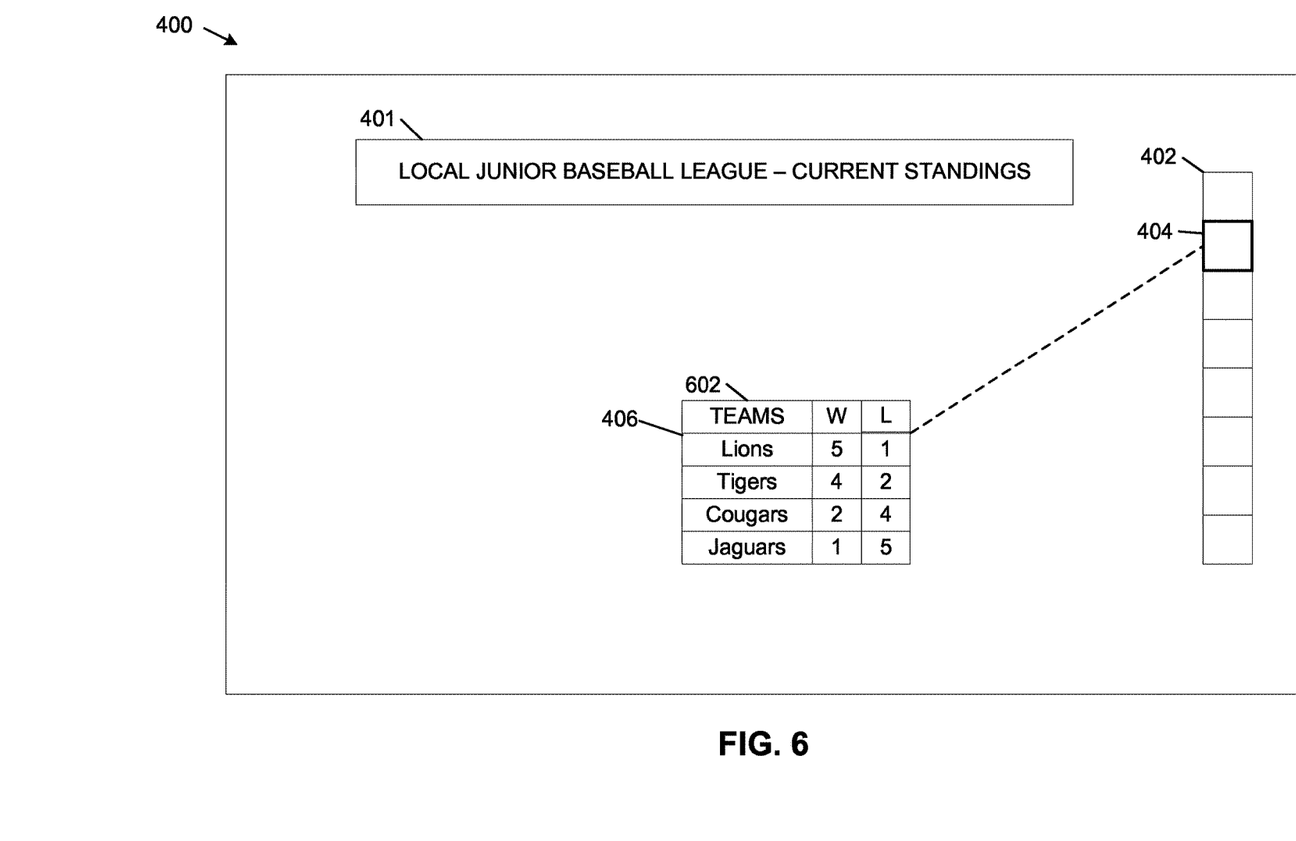
FIG. 6 shows an example document widget on web page rendered on the example web server of FIG. 1 that includes internal data from a document.

FIG. 6 shows an example web page 400 that includes data from a table that is mapped to document widget location 406. In this example, the data represents the won/loss record for teams in a baseball league. Additional headers or banners not part of the document can also be added to the example web page 400. FIG. 6 shows an example header 602 that describes the columns of the table displayed at location 406, indicating that one column represents teams, another represents wins and another represents losses.

A user can also initiate a process to display document data on a website from a client system, for example from client 102, 104, 106. This is typically the case when document data is stored on the client system or on a file server accessible to the client system. Typically, the user opens the document, identifies a section of the document to be displayed on the website and then activates a wizard on the client system, for example by pressing an example website publishing button on the client system. The example wizard activates one or more dialog boxes that permit the user to logon to the website on which document data is to be displayed, activate a document widget on the website to select a location for display of the document data and to select a web page component, for example a table or a graph, corresponding to the format in which the document data is to be displayed. It should be appreciated that a user logon is one example of user authentication. Other types of authentication are possible, for example biometrics such as fingerprints, voice recognition, etc.

The example wizard also permits the user to select when document data is to be updated on example web page 400. For example, document data can be updated automatically whenever a user performs a save operation. In another example, document data is uploaded only when a user presses a special button, for example a publish button, on the user interface of the client system. The use of a publish button permits the user to have more control over when the document data is displayed on the example web page 400. Other user actions that result in updating identified document data to example web page 400 are possible.

Figure 7:
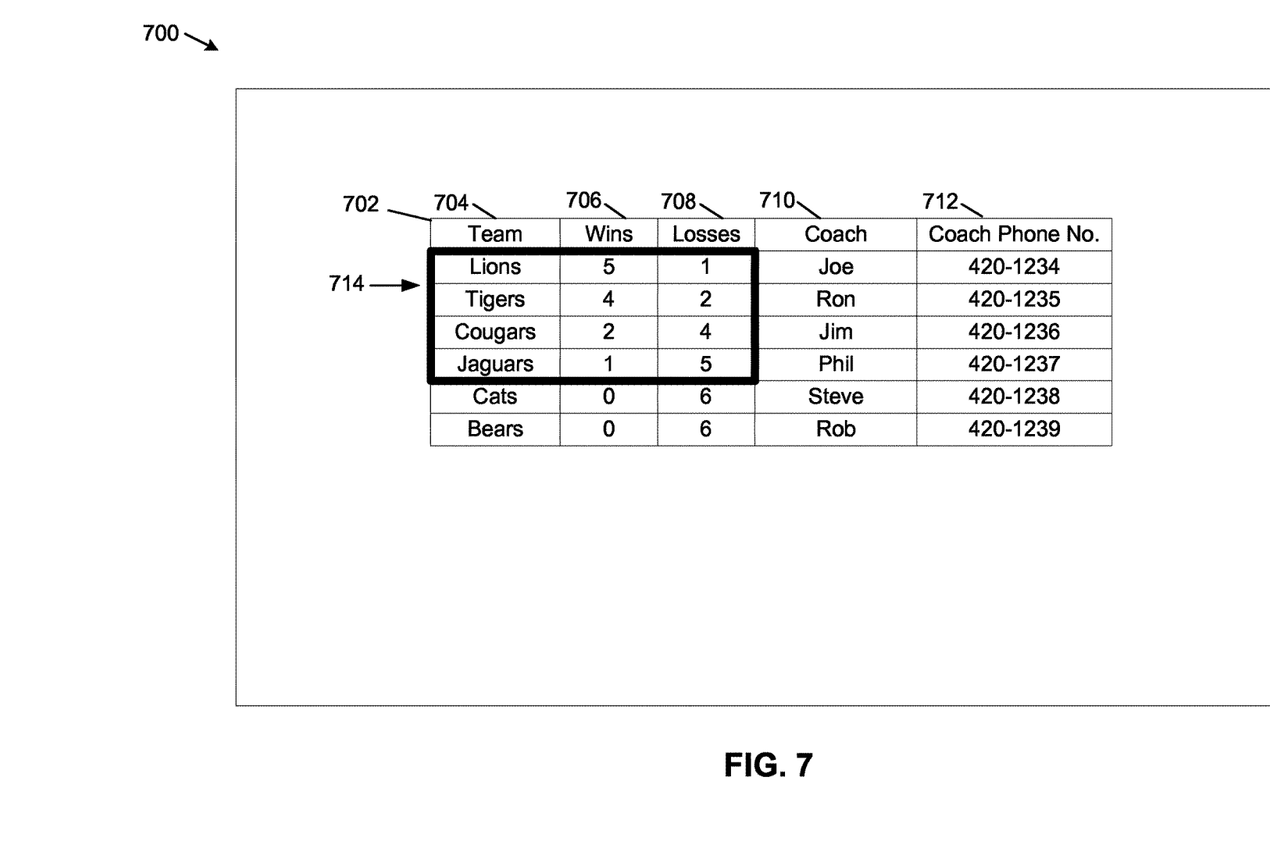
FIG. 7 shows an example document that includes a document section rendered on the example document widget of FIG. 6.

FIG. 7 shows a portion of an example document 700 opened at a client system, for example client 102, 104, 106. The portion of the example document 700 shows a table 702 including data from a baseball league. The data includes a team header 704, wins header 706, losses header 708, coach header 710, and coaches phone number header 712. League data are displayed in the various columns of the table. The user can identify a section of the table to be displayed on example web page 400. For example, the user can highlight document section 714. Then, when the user performs a save operation or activates a publish button, etc., the identified document data is displayed on example web page 400. For example, document widget 406 in FIG. 6 shows the display of document data identified in section 714.

Figure 8:
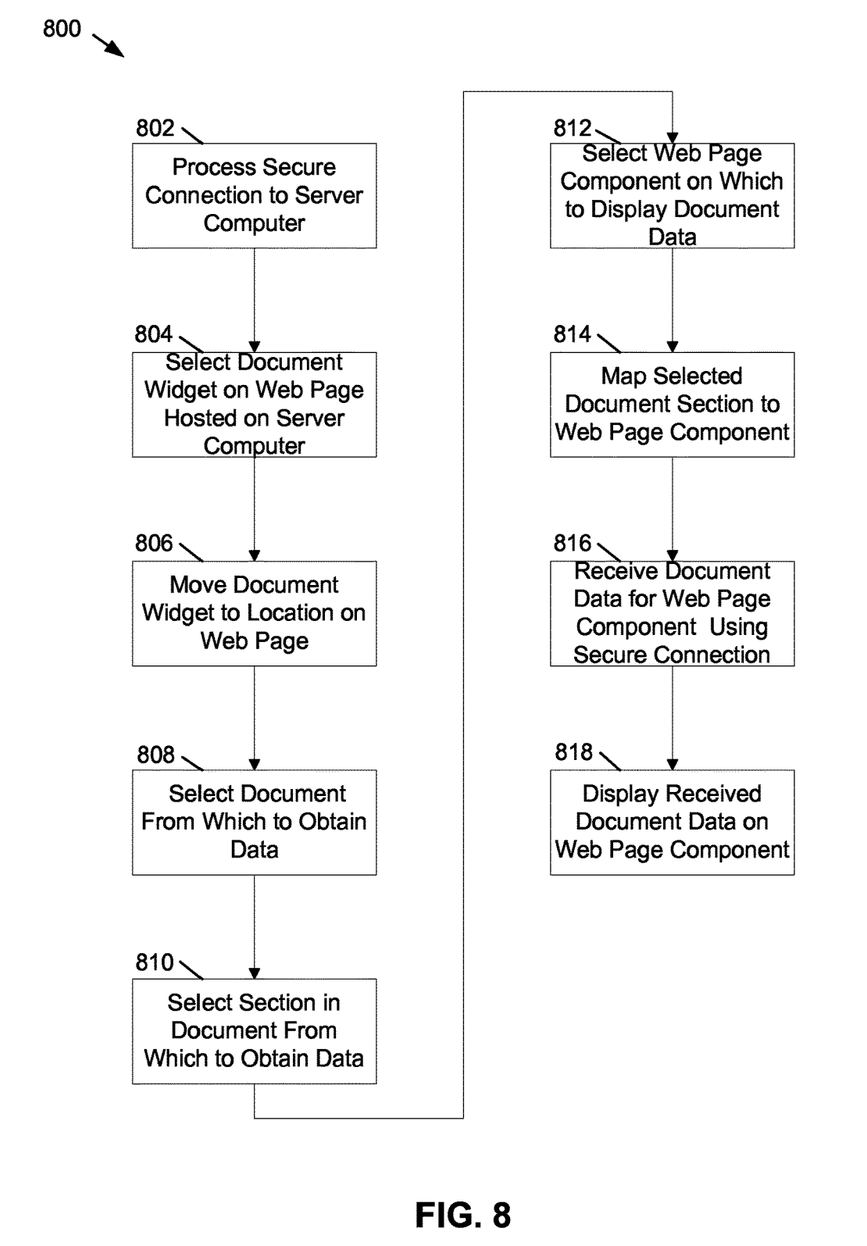
FIG. 8 shows a flowchart for a method for displaying data from a section of a document on a website when the document is stored on a server.

FIG. 8 shows a flowchart for an example operation 800 for displaying data from a section of a document on a website when the document is stored on web server 108. The website is typically an individual or small company website hosted on web server 108 and built via a software application such as Microsoft Office Live Small Business 2007. It should be appreciated that the flowchart shown in FIG. 8 is an example of one operation 800. More, fewer or different steps are possible.

At operation 802, web server 108 processes a user login to the website. The user typically logs on to the website from a client system, for example client 102, 104, 106. When logging on the website, the user provides a secure login identifier, for example a LiveID identifier, and a password. The login provides a secure connection between the client system and web server 108.

At operation 804, the user selects a document widget from a web page on the website. The document widget is selected from a plurality of widgets made available on the web page. The document widget is a software tool that provides functionality for identifying a section of a document to be displayed on a web page, establishing a connection to a computing system where the document is stored, selecting a web page component in which to display the document, providing a location for the document to be displayed on the web page and displaying document data in a web page component. Operations associated with the document widget are processed by the example document widgets module 202.

At operation 806, a user moves the document widget to a desired location on the web page, typically by dragging the document widget to the desired location on the web page. The document widget is also expanded in size when dragged to provide an area in which the document data is displayed.

When the document widget is moved to the desired location on the web page, at operation 808 the user selects a document from which to obtain data. The user identifies the document by browsing for the document via a user interface on the web page. Typically, the user interface is a dialog box, for example dialog box 508, which is displayed on the web page when the document widget is moved to the desired location. The user selects the identified document via example dialog box 508. When the user selects the identified document, a connection is established between the document widget and the document.

At operation 810, the user selects a section in the identified document from which to obtain data to be displayed on the web page. Typically, the example user interface module 304 provides an application programming interface (API) for the identified document from which sections of the document can be selected. For example, the API typically permits a user to select a page of a document, for example a page of a Microsoft Word word processing software document or a worksheet in an EXCEL® spreadsheet software document.

The API also typically permits a user to select a data element in the document, for example a table or a graph. In addition, example APIs permit the user to select a portion of a data element, for example to select a range of rows and columns of a table. Alternatively, in example embodiments, a user identifies a section of a document by opening the document and highlighting a section of the document to be selected.

At operation 812, the user identifies a web page component on the web page on which to display document data. The example web page component module 302 provides a plurality of web page components from which the user can choose. Example web page components are a table and a graph. The web page component selected is displayed in the expanded area of the located document widget.

At operation 814, the example mapping module 306 maps the selected document section to the selected web page component. Mapping is needed because the size of the selected web page component displayed at the document widget location, for example a table, is typically different than the size of the table in the document. In addition, mapping is needed because the format of the document is typically different than the format of the selected web page component.

At operation 816, a block of document data is received for the selected web page component from the computer system on which the document is stored, in this example from web server 108. The block of document data represents changes to the selected section of the document as a result of a user edit. The user edit typically occurs at a client system, for example client 102, 104 or 106. However, any changes made at the client system are updated to the document stored on web server 108. Data is sent from the client system to web server 108 via a secure connection that is established when the user logs in to web server 108.

At operation 818, the block of document data received at operation 516 is displayed on the selected web page component. The block of document data is displayed on the selected web page component because of the connection between the document widget on web server 108 and the document. This connection ensures that whenever data is updated in the selected section of the document, the selected web page component is automatically updated with the updated data.

Figure 9:
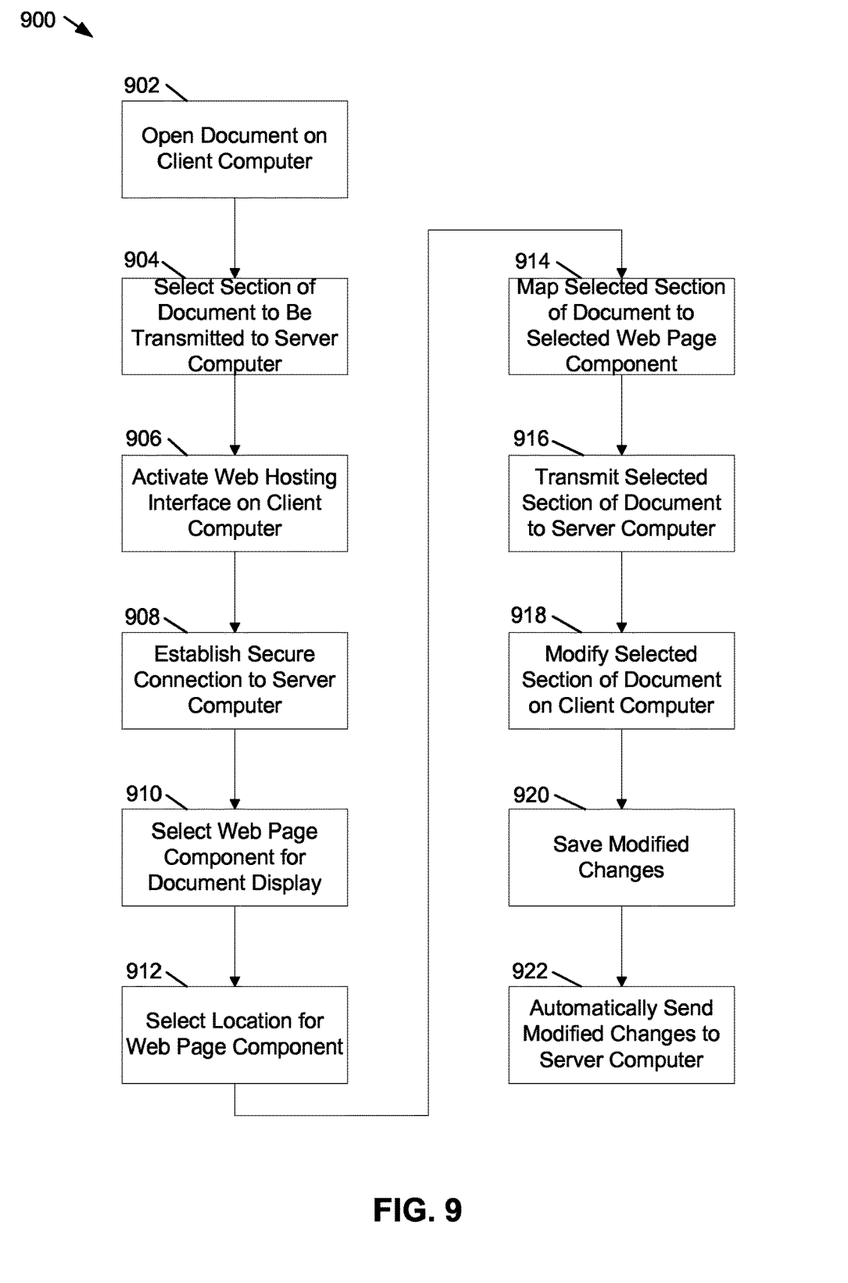
FIG. 9 shows a flowchart for a method for displaying data from a section of a document on a website when the document is stored on a client.

FIG. 9 shows a flowchart for an example operation 900 for displaying data from a section of a document on a website when the document is stored on a client system, for example on client 102, 104, 106. It should be appreciated that the flowchart shown in FIG. 9 is an example of one operation 900. More, fewer or different steps are possible. At operation 902, the document is opened at a client computer, for example on client 102, client 104 or client 106. At operation 904, a section of the document is selected to be transmitted to a server computer, for example web server 108, for display on a web page hosted on the server computer. Item 714 of FIG. 7 shows an example of a selected section of a document, corresponding to rows and columns of a table.

At operation 906, a user on the client computer activates a web hosting interface on the client computer, typically by pressing or clicking a button on the client computer representing web hosting. The button is typically included within a word processing application running on the client computer. When the user activates a web hosting interface, a dialog box is displayed from which, at operation 908, the user establishes a secure connection to web server 108. The user typically enters a userID and password to connect to web server 108. Once the connection to web server 108 is established, document data transmitted between the client computer and web server 108 includes a secure identifier, typically by using a cryptographic protocol such as Secure Sockets Layer (SSL).

When the connection is established between the client computer and web server 108, one or more dialog boxes are displayed from which the user enters configuration information. At operation 910, the user selects a web page component for display of document data on the web page. The selection is typically made from a drop down list box provided on one of the one or more dialog boxes.

At operation 912, the user selects a location for the web page component on the web page. In some example embodiments, the user selects grid coordinates for an area of the web page. In other example embodiments, a grid of the web page is displayed and the user selects an available section of the grid. Other techniques for selecting a location of the web page are possible.

At operation 914, data from the selected section of the document is mapped to the web page component. The data is mapped to adjust the size of the selected section of the document, for example a document graph, with the size of the graph as displayed on the web page.

At operation 916, the selected section of the document is transmitted to web server 108. Data in the selected section of the document, for example a graph or selected rows and columns of a table, are transmitted to web server 108 over the secure connection established in operation 908.

At operation 918, the user edits the selection section of the document, either by making changes to the content or by adding new content. At operation 920, the user saves the edited changes. When the user saves the edited changes, at operation 922, data in the selected section of the document are sent to web server 108. The data sent to web server 108 at operation 922 contains the modified changes. The web page component on the website is automatically updated with the modified changes.

Figure 10:
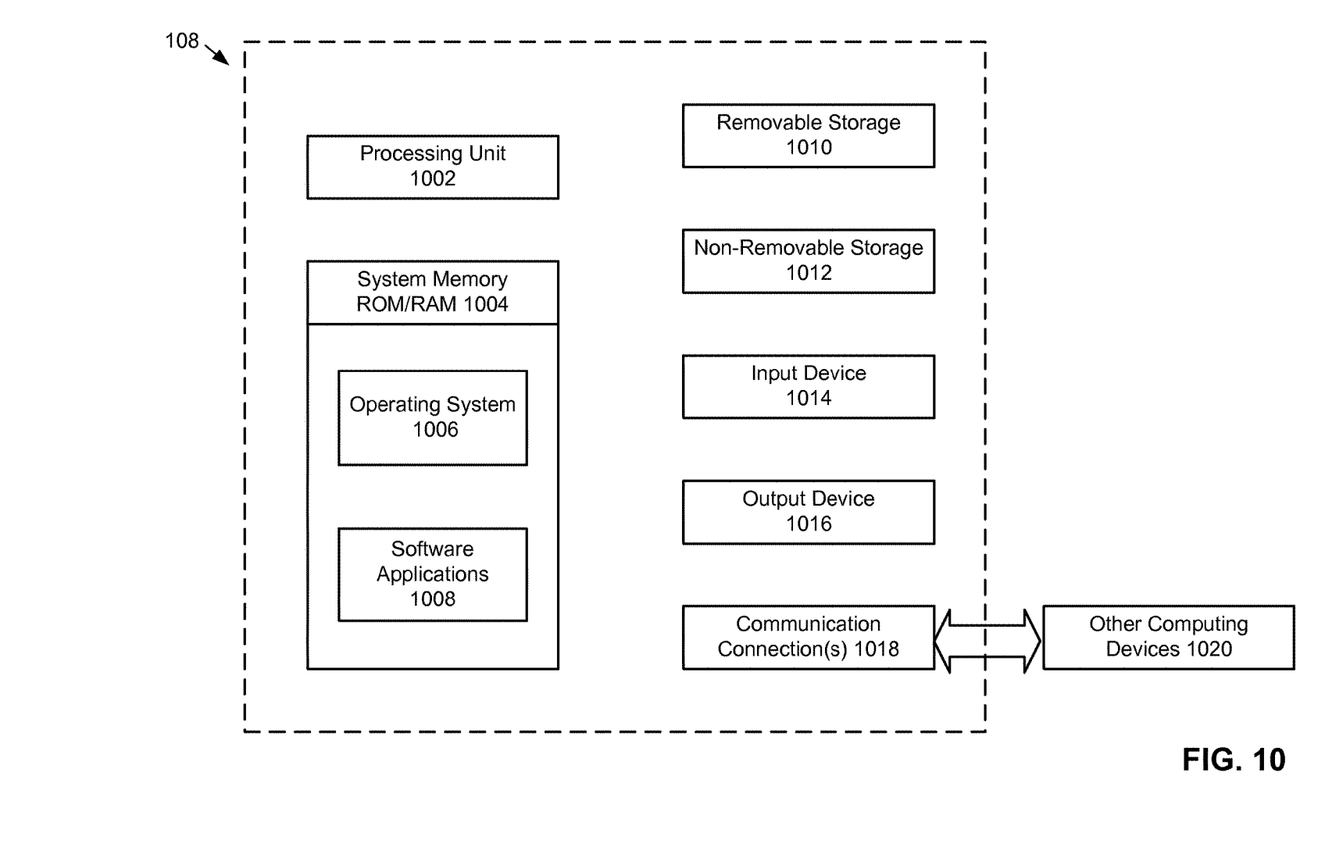
FIG. 10 shows example components of the web server of FIG. 2.

With reference to FIG. 10, example components of server 108 are shown. In example embodiments, the server 108 is a computing device, such as a server computer. The server 108 can include input/output devices, a central processing unit ("CPU"), a data storage device, and a network device.

In a basic configuration, the server 108 typically includes at least one processing unit 1002 and system memory 1004. Depending on the exact configuration and type of computing device, the system memory 1004 may be volatile (such as RAM), non-volatile (such as ROM, flash memory, etc.) or some combination of the two. System memory 1004 typically includes an operating system 1006 suitable for controlling the operation of a networked personal computer, such as the WINDOWS® operating systems from Microsoft Corporation of Redmond, Wash. or a server, such as Windows SharePoint Server 2007, also from Microsoft Corporation. The system memory 1004 may also include one or more software applications 1008 and may include program data.

The server 108 may have additional features or functionality. For example, the server 108 may also include additional data storage devices (removable and/or non-removable) such as, for example, magnetic disks, optical disks, or tape. Such additional storage is illustrated in FIG. 10 by removable storage 1010 and non-removable storage 1012. Computer storage media may include volatile and nonvolatile, removable and non-removable media implemented in any method or technology for storage of information, such as computer readable instructions, data structures, program modules, or other data. System memory 1004, removable storage 1010 and non-removable storage 1012 are all examples of computer storage media. Computer storage media includes, but is not limited to, RAM, ROM, EEPROM, flash memory or other memory technology, CD-ROM, digital versatile disks (DVD) or other optical storage, magnetic cassettes, magnetic tape, magnetic disk storage or other magnetic storage devices, or any other medium which can be used to store the desired information and which can be accessed by server 108. Any such computer storage media may be part of server 108. Server 108 may also have input device(s) 1014 such as keyboard, mouse, pen, voice input device, touch input device, etc. Output device(s) 1016 such as a display, speakers, printer, etc. may also be included. These devices are well known in the art and need not be discussed at length here.

The server 108 may also contain communication connections 1018 that allow the device to communicate with other computing devices 1020, such as over a network in a distributed computing environment, for example, an intranet or the Internet. Communication connection 1018 is one example of communication media. Communication media may typically be embodied by computer readable instructions, data structures, program modules, or other data in a modulated data signal, such as a carrier wave or other transport mechanism, and includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, RF, infrared and other wireless media. The term computer readable media as used herein includes both storage media and communication media.

In examples, the clients 102, 104, 106 can also be computing devices configured in a manner similar to that of server 108.

The various embodiments described above are provided by way of illustration only and should not be construed to limiting. Various modifications and changes that may be made to the embodiments described above without departing from the true spirit and scope of the disclosure.

What is claimed is:

1. A method implemented on a server computer for importing data into a web page hosted on the server computer, the method comprising:
   receiving a selection of a document widget at the server computer, the document widget being a graphical user interface component available at the server computer;
   receiving a location to position the document widget;
   in response to receiving the location to position the document widget, positioning the document widget at the location on the web page;
   in response to positioning the document widget at the location on the web page, receiving identification of a document in a first format from which data is to be obtained, the document being locally stored on a client computer;
   after the document is identified, establishing a connection between the document widget and the document;
   after the connection is established, receiving a selection that identifies a section of the document from which data is to be obtained;
   receiving a selection of a web page component on the web page in which to display data from the document within the web page component in the second format;
   receiving a block of document data comprising data from the identified section of the document;
   in response to receiving the block of document data, automatically updating the web page component on the web page;
   mapping the document data in the first format to the web page component in the second format; and
   sending data from the server computer to display the mapped document data within the web page component on the web page.

2. The method of claim 1, comprising:
   receiving updated document data when the document has changed; and
   in response to receiving the updated document data, updating the web page component on the web page with the updated document data such that the web page displays the web page component with the document data.

3. The method of claim 2, wherein receiving updated document data when the document has changed occurs when a save operation for the document is processed.

4. The method of claim 1, further comprising, providing a secure connection between the server computer and a client computer, the block of document data being transmitted to the server computer from the client computer using the secure connection.

5. The method of claim 1, wherein mapping the selected document data in the first format to the web page component in the second format further comprises translating the coordinates of the selected document data in the document to coordinates of the web page component.

6. The method of claim 1, wherein the section of the document is a highlighted portion of the document.

7. The method of claim 1, further comprising the document widget being selected from a plurality of widgets on the server computer, the selection of the document widget activating a user interface associated with the document widget on the server computer, the document being selected via the user interface.

8. The method of claim 1, further comprising the document originating from a third party application.

9. The method of claim 8, further comprising sending configuration and security information from the server computer to the third party application.

10. The method of claim 1, further comprising the server computer periodically requesting the block of data from a data storage system.

11. A system for importing data into a web page hosted on the server computer, the system comprising:
   a processing unit; and
   a storage device comprising instructions that, when executed by the processing unit of an electronic computing device, cause the processing unit to:
   receive a selection of a document widget at the server computer, the document widget being a graphical user interface component available at the server computer;
   receive a location to position the document widget;
   in response to receiving the location to position the document widget, position the document widget at the location on the web page;
   in response to positioning the document widget at the location on the web page, receive identification of a document in a first format from which data is to be obtained, the document being locally stored on a client computer;
   after the document is identified, establish a connection between the document widget and the document;
   after the connection is established, receive a selection that identifies a section of the document from which data is to be obtained;
   receive a selection of a web page component on the web page in which to display data from the document within the web page component in the second format;
   receive a block of document data comprising data from the identified section of the document;
   in response to receiving the block of document data, automatically update the web page component on the web page;
   map the document data in the first format to the web page component in the second format; and
   send data from the server computer to display the mapped document data within the web page component on the web page.

12. The system of claim 11, wherein the processing unit is further caused to:
   receive updated document data when the document has changed; and
   in response to receiving the updated document data, update the web page component on the web page with the updated document data such that the web page displays the web page component with the document data.

13. The system of claim 12, wherein receipt of updated document data occurs when a save operation for the document is processed.

14. The system of claim 11, wherein the processing unit is further caused to: provide a secure connection between the server computer and a client computer, the block of document data being transmitted to the server computer from the client computer using the secure connection.

15. The system of claim 11, wherein the processing unit is further caused to: translate the coordinates of the selected document data in the document to coordinates of the web page component when the selected document data in the first format is mapped to the web page component in the second format.

16. The system of claim 11, wherein the section of the document is a highlighted portion of the document.

17. The system of claim 11, wherein the processing unit is further caused to: select the document widget from a plurality of widgets on the server computer, the selection of the document widget activating a user interface associated with the document widget on the server computer, the document being selected via the user interface.

18. The system of claim 11, wherein the document originates from a third party application.

19. The system of claim 18, wherein the processing unit is further caused to: send configuration and security information from the server computer to the third party application.

20. The method of claim 11, wherein the server computer periodically requests the block of data from a data storage system.

* * * * *